United States Patent [19]
Brighenti

[11] 3,950,053
[45] Apr. 13, 1976

[54] ASSEMBLING UNIT FOR MODULAR ELECTRICAL APPARATUS

[75] Inventor: Norberto Brighenti, Milan, Italy

[73] Assignee: Zeus Rapizzi S.p.A., Italy

[22] Filed: June 3, 1974

[21] Appl. No.: 475,458

[30] Foreign Application Priority Data
June 12, 1973  Italy .................................. 25122/73

[52] U.S. Cl. ............ 339/34; 339/122 F; 339/126 R
[51] Int. Cl.² .................... H01R 13/14; H01R 13/10
[58] Field of Search ....... 339/23, 24, 34, 36, 119 R, 339/122 R, 122 F, 123, 126 R, 163, 164, 166, 170

[56] References Cited
UNITED STATES PATENTS

| | | | |
|---|---|---|---|
| 1,300,286 | 4/1919 | McKay | 339/122 F X |
| 2,196,842 | 4/1940 | Strazzabosco | 339/34 |
| 2,673,969 | 3/1954 | Pfister | 339/34 X |
| 2,934,590 | 4/1960 | Thompson et al. | 339/36 X |
| 3,141,721 | 7/1964 | Horn | 339/164 R X |
| 3,433,886 | 3/1969 | Myers | 339/34 X |

FOREIGN PATENTS OR APPLICATIONS
956,528   11/1936   United Kingdom ................... 339/34

*Primary Examiner*—Joseph H. McGlynn
*Assistant Examiner*—Craig R. Feinberg
*Attorney, Agent, or Firm*—Woodling, Krost, Granger & Rust

[57] ABSTRACT

A unit for the assembling of modular electrical apparatus comprising a supporting element having a base wall defining a space for the lodging of modular electrical apparatus; the said surface having openings for the passage of electric wires for connecting to the apparatus; the structure of these latter having a wide front surface and being relatively thin so as to occupy all the space of the supporting element. Fixing means to releasably fix each electrical apparatus in the space of the mentioned supporting element are provided.

11 Claims, 9 Drawing Figures

U.S. Patent  April 13, 1976  Sheet 1 of 2  3,950,053
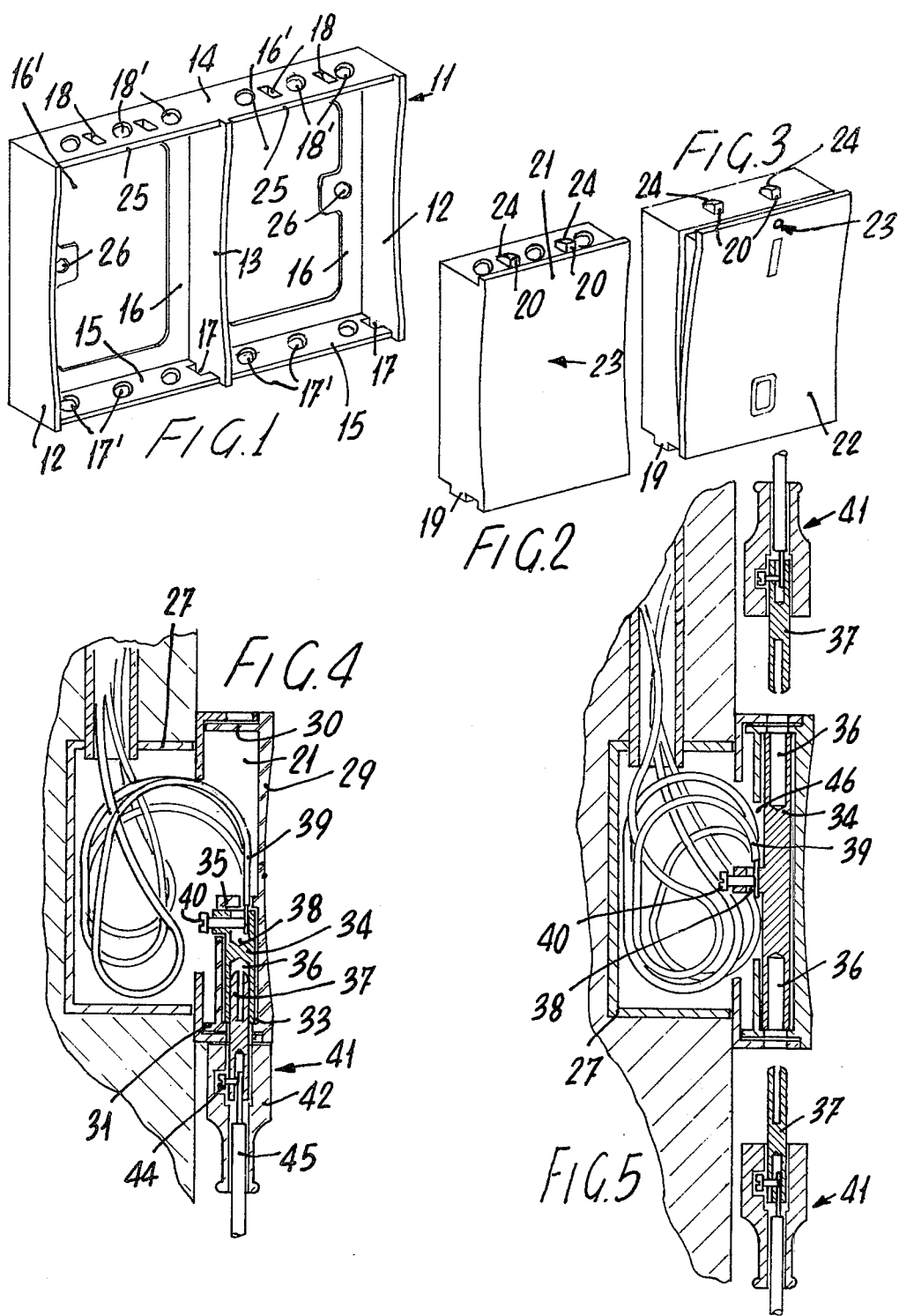

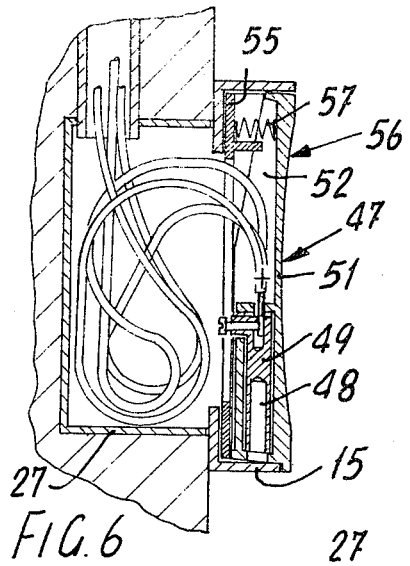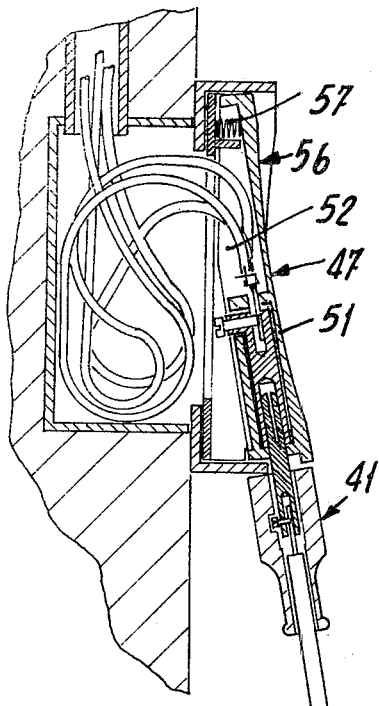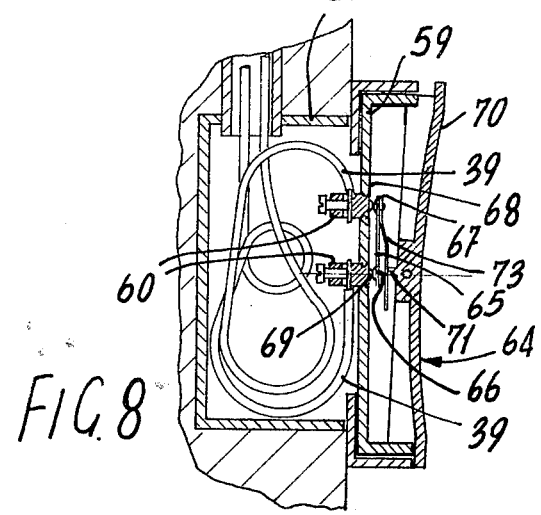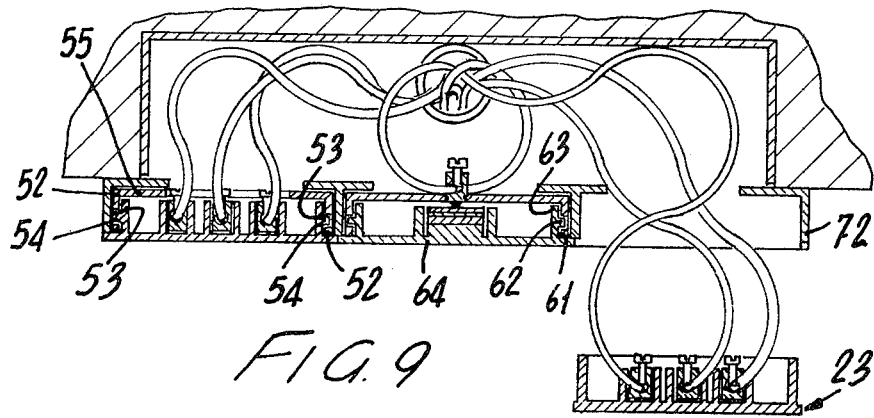

ASSEMBLING UNIT FOR MODULAR ELECTRICAL APPARATUS

The present invention refers to an apparatus or an assembly unit for modular electrical apparatus, the expression "electrical apparatus" meaning switches in general, pin plugs, pilot lights, push buttons and the like.

Set in modular apparatus for electrical plant for civilian use in homes, schools, hotels etc., are generally made of control and signal modular apparatus, as for example switches, pin plugs, pilot lights, push buttons etc., and comprise frames for the supporting of such modular apparatus and suitable plates to cover the said small frames.

Known apparatus are conceived so as to exploit to the maximum the capacity of boxes set into walls and consequently modular apparatus occupy practically all the space of the said set-in boxes placing at the disposal of the passage of the electric wires, a very small amount of space; this impedes easy installation on the part of the installer of said apparatus.

This aspect worsens when, in the same space of a set-in box, the constructor places more than one modular apparatus, sometimes even four apparatus; in these cases the mass of electric wires inside the set-in box is such as to endanger the electric insulation of the plant.

The installer who has to install the known apparatus must assemble, in chronological order, the modular apparatus on the frames by means of screws or other known means; must connect the modular apparatus to the electric wires coming from the set-in boxes; he must fix with screws the frames on the set-in boxes and successively must cover the said frames with the suitable plates.

In carrying out the connection of the electric wires the installer must compulsoraly join all the modular apparatus, containable within the frame, and must then mount on the wall in the set-in box the frame simultaneously moving all the electric wires connected to the said modular apparatus.

During this operation the wires may be placed in a disorderly fashion in the set-in box and may, in some cases, tighten out in such a way as to prejudice the electrical connection and therefore the best functioning of said modular apparatus.

When the user has to substitute or inspect one of these modular apparatus, he is obliged to remove from the wall those apparatus which are not of interest but are fast to the same frame together with the relative electric wires.

A further inconvenience complained of by users of these electric plant for civilian use is that of the jutting out from the wall of the plugs which are inserted in the elements set-in the wall, called plug sockets.

With known set-in apparatus the user finds the plug sockets have the plug holes placed frontally perpendicular to the walls of the room.

Consequently, when the user has to connect electrical apparatus (appliance) to the electricity supply, such as, for example, a household appliance, he has to insert the plug of said electrical appliance into said wall socket in such a way that the plug and relative electric wire jut out perpendicularly from them.

One of the aims of the present invention is that of placing at the disposition of installers an assembling unit for modular apparatus which due to their shape can be easily composed and practically mounted in the set-in box without the wires therein contained being able to prejudice the functioning of the modular apparatus.

Another aim is that of giving a series of apparatus with which the installer can join and fix to the wall one at a time the modular apparatus on a one and the same bearing element in correspondence with a normal set-in box.

A further and important aim is that of furnishing the users with modular elements "plug sockets" placed in such a way as to have the plug-in holes parallel to the wall so as to allow the plug of the electrical apparatus to also be placed parallel to the wall without taking up space in the room.

In general, an assembling unit for electric modular apparatus according to the invention, is characterized by the fact that it comprises a supporting element having a base wall defining a space for the lodging of the cited modular electric apparatus, the said base wall having openings for the passage of the electric joining wires to the modular apparatus, the structure of these latter having a wide front surface and being relatively thin, so as to occupy all the space of the supporting element, and means for fixing in a releasable manner each single electrical apparatus in the space of the above mentioned supporting element.

Said support may have internal and peripheral walls to define a box with one or more openings for lodging the electrical apparatus of which the front surface is mainly visible, or it may be made of a simple plate, in which case the apparatus placed one beside the other will be entirely visible. In the first case the holes and the openings for the passage of the pins may be already placed on one or more lateral walls, further to being in the body of the current socket, while in the second case the holes or openings for the insertion of the pins in the corresponding holes of the socket are foreseen on one side of the body of the socket itself to allow the insertion of a plug always parallel to the wall as mentioned above.

The invention will be described with reference to some embodiments at present prefered, given exclusively as an illustration, and not therefore limiting.

In the drawings:

FIG. 1 represents a perspective view of a supporting box with two places for modular apparatus;

FIG. 2 represents a perspective view of the "socket" modular apparatus;

FIG. 3 represents the perspective view of the "switch" modular apparatus;

FIG. 4 represents a cross-section of a set-in wall box, of a supporting box and a simple "socket" modular apparatus;

FIG. 5 represents a cross-section of a set-in wall box, of a supporting box and a double "socket" modular apparatus;

FIG. 6 represents a cross-section similar to that in FIG. 4 but with simple sockets having hidden holes;

FIG. 7 represents the section of FIG. 6 in which the pin plug is inserted;

FIG. 8 represents a cross-section of a set-in wall box, of a supporting box and a "switch" modular apparatus;

FIG. 9 represents the longitudinal section of a set-in wall box, a three place supporting box and three modular apparatus of which one is not inserted in the said supporting box.

With reference to FIG. 1, in this is shown a supporting box 11, which is foreseen with two places for electrical apparatus, but might also have one, three or more places, this is the element which in the system has the task of supporting the modular electrical apparatus, indicated with the numbers 21 and 22 in the FIGS. 2 and 3.

Said box 11 is composed of peripheral cross walls 12, of peripheral longitudinal walls 14 and 15, and of a back wall 16, which all together define a lodging space for the cited electrical apparatus 21 and 22; if desired this space could be divided up into several separate spaces, one for each modular apparatus, by means of internal walls or transversal sections 13.

On the walls 14 and 15 rectangular holes 17 and 18 exist which are to receive the small feet or projections 19 and 20 of the modular apparatus 21 and 22 respectively FIGS. 2 and 3 to releasably fix these latter.

To insert the modular apparatus 21 and 22 in the box 11 it is only necessary to place the small projections 19 in the holes 17 situated on the peripheral wall 15 and then force in the direction of the arrow 23 the said apparatus 21 and 22.

When the inclined surfaces 24 of the projections 20 hit against the sharp corner 25 of the wall 14, they elastically deform said wall 14, which is made of a resiliently yielding material, and successively penetrate into the holes 18 remaining fixed therein.

In these drawings the fixing of the modular apparatus is foreseen by means of snap engagement; but if necessary it could be fixed by means of screws.

On the back wall 16 there are the holes 26 which serve for the passage of the screws to fix the supporting box 11 on the set-in box 27. Furthermore, the back wall 16 has one or more wide openings 16' which allow the easy passage of the electric wires to be joined to the apparatus 21 and 22.

FIGS. 2 and 3 show in perspective view two examples of modular apparatus and precisely a socket and a switch.

In the same space are foreseen the realization of switches, commutators, pilot lamps, push buttons, indicators, regulators etc.

The structure of these modular apparatus is such as to contain all the pieces which go to make them up on a wide surface and in a very limited thickness.

This structure permits the occupation of all the space in the supporting box 11, in contrast to known apparatus where it is necessary to make use of covering plates; the solution proposed has the enourmous advantage of leaving free the set-in wall box so as to be able to contain a length of the connecting wires such as to allow easy connection of said modulator apparatus.

FIG. 4 represents the cross-section in correspondence with the wall socket 21 of FIG. 2 mounted on the supporting element or box 11 which is fixed to the wall on the set-in box 27.

The front wall 29 of the wall socket is integral with the end cross walls 30 and 31, of which in the wall 31 the seats 33 are made in which the bushings 34 lodge. The wall 33 serves to keep the bushings 34 in the seat.

Said bushings have the holes 36 into which the pins 37 of a plug are pushed, the holes 38 for the insertion of the electric wires 39 and the screws 40 for the blocking of the said wires 39 on said bushings 34.

Once the connection between the electric wires 39 has been carried out, and fixed by means of the above described elements, the wall socket 21 on the box 11, it is possible to insert the electric plug 41 which represents the means by which it is possible to take the current from the wall socket 21 to supply it, for example, to an electric appliance not indicated in the figure.

The plug 41 represents a known element normally utilized for these purposes and is composed of a wrapping 42, of the cited pins 37 and the screws 44 which serve to block the electric wires 45 which come from the domestic appliance which is to be operated. From FIG. 4 can be noted how the plug 41 can be placed parallel to the wall inserting its two pins 37 in the wall socket through suitable openings 17' and/or 18' suitably placed on peripheral walls of the supporting box 11.

FIG. 5 shows the case of a double wall socket.

None of the modular apparatus at present known can, due to their shape, give modular apparatus with the possibility of a double wall socket available in a single module.

To obtain this combination the known modular apparatus propose the use of two wall sockets placed side by side.

In practice however when the user needs to insert two domestic appliances in a single wall socket he reverts to the use of an auxiliary multi-plug which when inserted into the wall socket permits the use of further plugs. These multi-plugs, besides being dangerous are also cumbersome.

The double wall socket 46 in FIG. 5 offers an elegant and simple solution which eliminates the above mentioned inconveniences.

Unlike the wall socket 21 the double wall-socket 46 has bushings 34 which are longer and on the said bushings 34, there are two counterplated holes 36.

On the central portion of the bushings 34 there is the hole 38 for the insertion of the electric wires 39 which are fixed to the said bushings 34 by means of the screws 40.

In FIG. 5 there are also shown, not inserted, two pin plugs 41 which are always placed parallel to the wall.

FIG. 6 shows a wall socket 47 which differs from those described in FIGS. 2 and 4 in that the hole 48 of the bushings 49 are hidden by the wall 15.

The wall socket 47 is made of the rocking body 51 which sustains the bushings 49 in the same way indicated in FIG. 4.

On the side walls 52, of the body 51, there are the two small pins 53 visible on the cross section of FIG. 9, which fit into the holes 54 on the lateral walls of a closure element 55 which completes the said wall sockets 47.

On the closure element 55 there are the small projections 19 and 20 similar as to what was described in the FIGS. 2 and 3. As can be seen from FIG. 7 the side walls 52 taper towards one extremity to allow the body 51 to oscillate around the cited pins 53. A spring 57 acts on the body 51 in the sense of keeping it constantly in its position of FIG. 6 with the holes of the sockets hidden by the wall 15 of the box 11, obviously in this case the wall of the supporting box 11 must be without holes, or these holes must be covered by an internal wall of the closure element 55 of the wall socket.

When one wishes to use the wall socket 47 it is necessary to press on point 56 so that the body 51 rotating on the small pins 53 comes into position, as indicated in FIG. 7 with the holes 48 in view for the insertion of the pin 41.

When the pin 41 is extracted the spring 57 returns the body 51 to the position in FIG. 6.

By means of this variant one has at ones disposition a "wall socket" modular apparatus which has the advantage of impeding the accessibility of the bushings under tension until it is desired to insert a utilizing pin plug.

FIG. 8 represents an example of a possible realization of a "switch" modular apparatus 22 of the FIG. 3.

The switch 22 is made of the base 59 on which are incorporated the clamps 60 to which the electric wires 39 are connected.

From the base 59 jut out the walls 61, FIG. 9, on which there are the holes for the pins 62 on the side walls 63 of the lever 64.

On the plate 65 there are the contacts 66 and 67 which in the drawings are closed on the contacts 68 and 69 fixed on the clamps 60.

The elastic plate 73 is fixed to the plate 65 and is maintained in tension by the point 71 of the lever 64.

FIG. 8 represents the switch in a position with the contacts closed.

When it is desired to place the switch in a position with the contacts open it is sufficient to act on the position 70 of the lever 64 and the tip of contact 69 passing beyond the straight line which is defined by the contacts 69 and 67, and by the pin 62 (FIG. 9) obliges the mobile contact 66 to detach itself from the fixed contact 68 and remain attached in that position until acting on the position 71 the lever 64 is returned to the position in FIG. 8.

FIG. 9 shows how it is possible to mount several modular apparatus, in this case a wall socket 47, a switch 22 and a pin plug 21, on a bearing box 72 having 3 points, but similar to the box 11 already described.

On FIG. 9 one of the modular apparatus has not yet been inserted to show that it is possible to carry out, one at a time, the connection and the mounting of the single modular apparatus.

I claim:

1. Electrical apparatus including in combination an electrical set-in box fixed in a wall structure and extending substantially to a front face surface of said wall structure, said set-in box containing electrical conductors within the confines thereof, a modular electrical apparatus supporting box having a back wall mounting same on said front face surface of said wall structure, said supporting box having side walls defining with said back wall, a chamber space which side walls extend outwardly from said front face surface of said wall structure, wall means in said back wall defining an opening for the passage of said electrical conductors from said set-in box to said supporting box, said supporting box having a front opening opposite said back wall, modular electrical apparatus located within said chamber space and occupying substantially all of said chamber space of said supporting box, said modular electrical apparatus being relatively thin and having a relatively large front face surface, electrical connection means connecting said electrical conductors to said modular electrical apparatus, and means for securing said modular electrical apparatus in said chamber space of said supporting box.

2. Electrical apparatus as claimed in claim 1, wherein said modular electrical apparatus comprises a plug socket, which has bushings for the pins of a plug, said bushings of said plug socket extending substantially parallel to said front face surface of said wall structure.

3. Electrical apparatus as claimed in claim 2, wherein at least one of said side walls of said supporting box has openings, which are preformed and aligned with the bushings of said plug socket.

4. Electrical apparatus as claimed in claim 3, wherein said openings or the pins of a plug are formed on two opposite side walls of said supporting box.

5. Electrical apparatus as claimed in claim 3, wherein said supporting box has internal walls for the subdivision of said chamber space into two or more separate areas for the reception of separate modular electrical apparatus.

6. Electrical apparatus as claimed in claim 4, wherein said modular electrical apparatus is a double plug socket.

7. Apparatus as claimed in claim 1, wherein said modular electrical apparatus comprises a plug socket having bushings for the reception of the pins of a plug, means for pivotally mounting said plug socket whereby same may be moved between first and second positions, said bushings of said plug socket being covered by a side wall of said supporting box in said first position and being exposed for the reception of said pins of said plug in said second position.

8. Apparatus as claimed in claim 7, wherein spring means act on said plug socket to urge same to said first position.

9. Electrical apparatus as claimed in claim 1, wherein said modular electrical apparatus is a switch, push-button or pilot light.

10. Electrical apparatus as claimed in claim 1, wherein said means for securing said modular electrical apparatus in said chamber space is of the snap-engagement type.

11. Electrical apparatus as claimed in claim 1, wherein said means for securing said modular electrical apparatus in said chamber space is of the screw type.

* * * * *